(No Model.) 2 Sheets—Sheet 2.
S. S. WHEELER.
ELECTRIC MOTOR OR DYNAMO ELECTRIC MACHINE.
No. 451,884. Patented May 5, 1891.
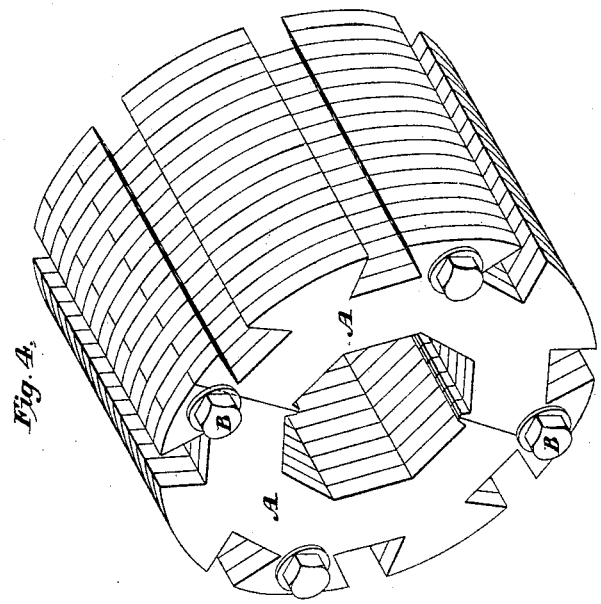
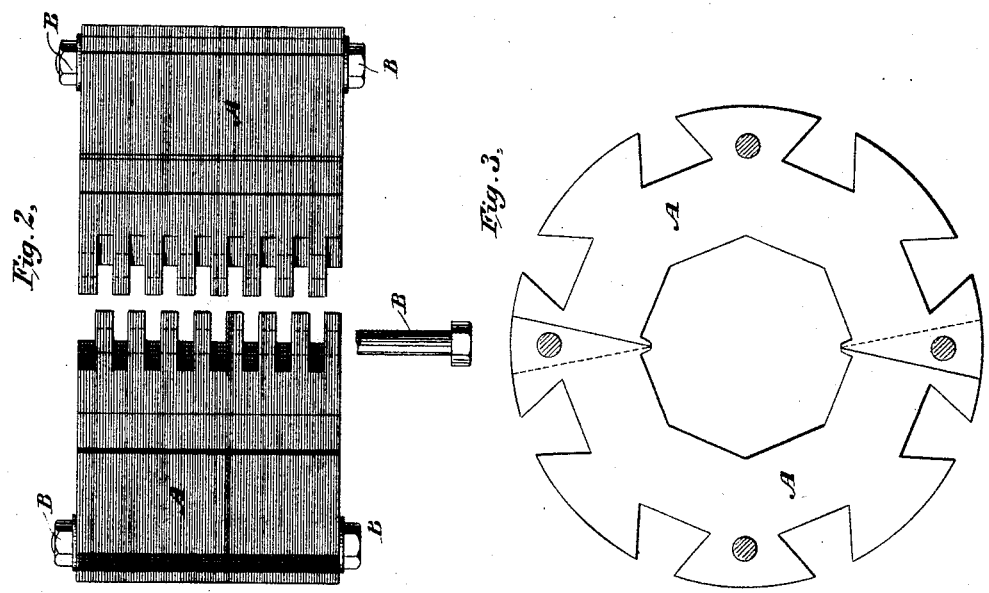
Witnesses
Geo. W. Breck.
Henry W. Lloyd.
Inventor
S. S. Wheeler
By his Attorney
Chas. G. Curtis

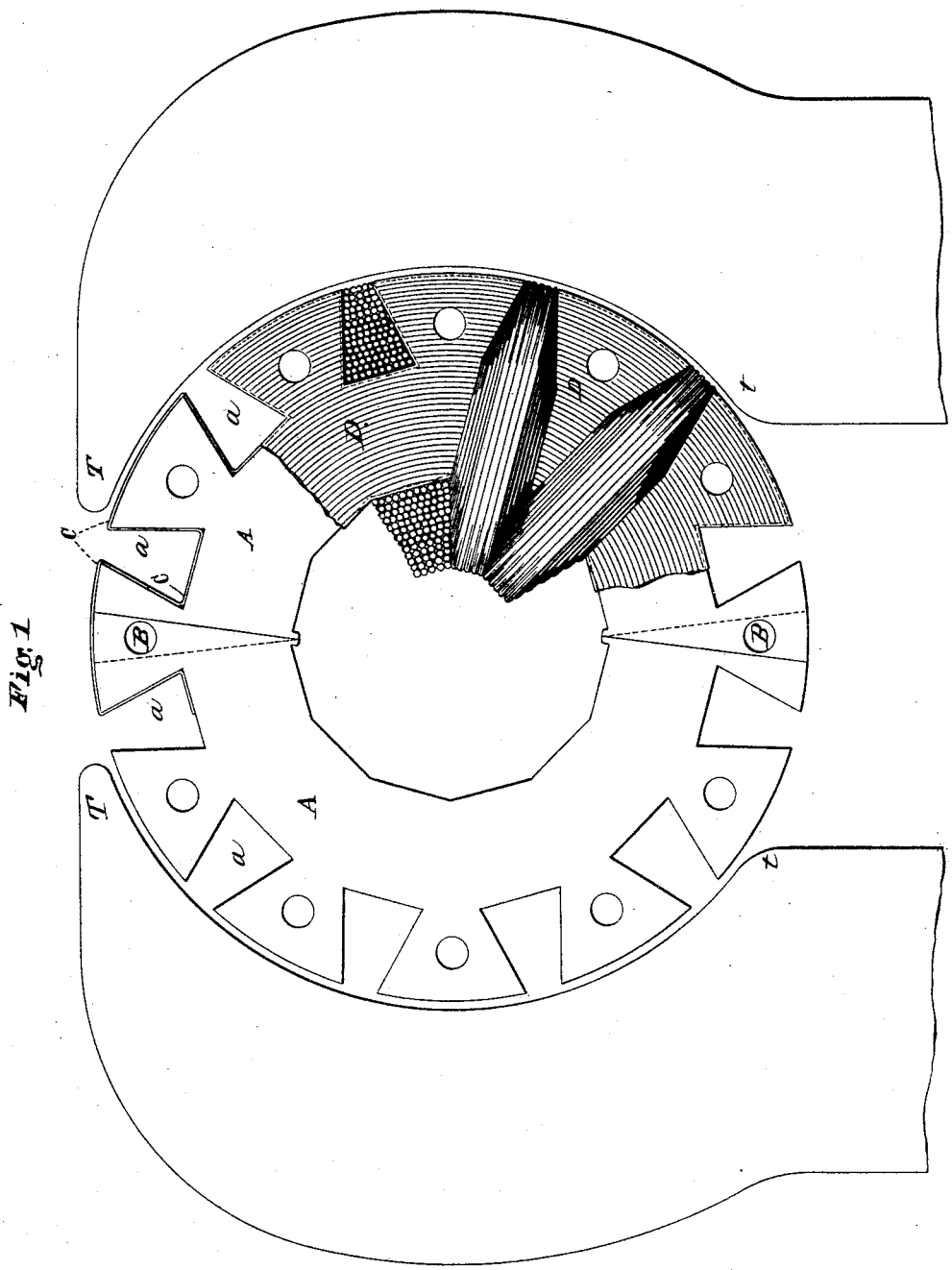

UNITED STATES PATENT OFFICE.

SCHUYLER S. WHEELER, OF NEW YORK, N. Y., ASSIGNOR TO THE CROCKER-WHEELER ELECTRIC MOTOR COMPANY, OF SAME PLACE.

ELECTRIC MOTOR OR DYNAMO-ELECTRIC MACHINE.

SPECIFICATION forming part of Letters Patent No. 451,884, dated May 5, 1891.

Application filed April 23, 1890. Serial No. 349,104. (No model.)

*To all whom it may concern:*

Be it known that I, SCHUYLER S. WHEELER, a citizen of the United States, residing in the city, county, and State of New York, have invented certain new and useful Improvements in Electric Motors or Dynamo-Electric Machines, of which the following is a specification.

Heretofore armatures for motors or dynamo-machines have sometimes been constructed with the iron armature-core reaching out to the faces of the pole-pieces, the copper conductors or winding being sunk in slots of greater or less depth in the surface of the core. The advantages of constructing the armature on this principle are that it increases the specific strength of the magnetism in the armature, owing to the fact that the gaps in the magnetic circuit are largely reduced. It increases the amount of conductor or winding that can be put upon the armature, since the slots can be carried in to a considerable depth. It reduces the amount of copper on the field necessary to bring it up to strength, and the copper winding, being sunk in the iron core, is entirely protected by it from mechanical injury.

My invention consists in certain improvements in this kind of armature especially applicable to the Gramme-ring form, the object of the invention being to increase as much as possible the amount of conductor or winding, to present as large a tooth-surface as possible to the field, to have the openings of the slots so narrow, compared with the iron portions or teeth lying between them, that the pole-pieces can be brought close to the armature-core without the production of eddy or Foucault currents in the pole-pieces, and to provide a better means of mechanically mounting the armature upon its shaft.

My invention will be understood from the accompanying drawings, in which—

Figure 1 shows an end view of my improved armature-core with a part of the winding or armature coils in place. Figs. 2 and 3 are side and end views, and Fig. 4 a perspective view, of my improved core.

A is the iron armature-core, which I prefer to make in two halves, which may conveniently be wound separately and afterward united together by dovetail joints and pins or bolts B B passing through the joints, though of course it may be made in a solid ring. The slots or spaces $a\ a\ a$, in which the windings are placed, I make in a trapezoidal or tapering form, as shown in the drawings—that is, so that they are quite narrow at the top and comparatively wide at the bottom with inclined sides. The shape of these slots—that is, their depth and their comparative width at the top and bottom as well as their average width—is determined by the size of the ring and the number of coils or sections there are to be in the winding. In the armature shown, for example, there are twelve coils or armature-sections, and the shape of each coil I preferably make such that it will form trapezoidal coils lying close to each other and completely filling the polygonal space on the inside of the ring. This trapezoidal shape of the inside portion of the coils determines the shape of the slots $a\ a\ a$, which receive the outer portion of the coils, as clearly shown.

To secure the greatest theoretical amount of winding for a given-size slot, it is evident that the shape of the coils should be strictly trapezoidal, the slot having straight sides; but this of course is not essential to my invention, as the slots and coils might be made of a generally trapezoidal shape—that is, so as to be wider at the bottom than at the top—without materially affecting the value of the construction. By constructing the slots and coils in this way I am able to secure a number of very important advantages.

First. The ring holds the greatest possible amount of copper conductor or winding, since the inner space of the ring which determines the amount of winding is completely or nearly filled with wire, the adjacent coils lying in contact and, being trapezoidal or approximately trapezoidal, practically occupy the full armature-space, so that the output of the armature is as great as possible from that cause.

Second. Each coil is symmetrical outside and inside the ring, so that the wire is easily and neatly laid in place and none of the wires cross each other.

Third. By making the slots $a\ a\ a$ very narrow at their openings the area of the tooth-surface or iron portion of the core presented to the field is increased to a maximum, which increases the specific strength of the magnetic field and enables the field to be saturated with less winding.

Fourth. The openings of the slots or gaps in the iron core being very small compared with the whole surface of the core, the pole-pieces can be brought close to the teeth without the production of eddy or Foucault currents in the pole-pieces.

Fifth. When the winding is once packed in the slot, the tapering shape of the slot prevents it from flying out by centrifugal force.

Sixth. The broad tooth furnishes an excellent means for mechanically mounting the core, because as the increased cross-section of the teeth toward their outer ends admits of adequate-size bolt-holes without throttling any of the magnetism, this enables the armature to be strongly mounted by bolts passing through bolt-holes in each tooth, if desired, as shown.

In order to prevent the winding from touching the iron core, I lay upon the outer surface of the core a sheet or strip of insulating material C, such as canvas, which is folded in to fit the slots and may conveniently be glued in place before the winding is applied. In each end of the ring I apply a plate of hard insulating material D D, such as fiber, cut in the shape of the iron core and of the same size or a trifle larger, so that its edges slightly fit or overhang the edges of the slot, as shown, so that when the wire is wound in place it will bear on the corners upon the fiber plate instead of upon the edges or corners of the iron, thus making leaks in the armature from this cause practically impossible.

In this form of armature, with the iron core reaching out to the pole-pieces, the magnetism is found to be so intense that with an unsymmetrical field—such as the ordinary horseshoe form, as shown in the drawings—there is a strong tendency of the field to draw the armature toward the yoke or the center of the field-magnet. To overcome this tendency as far as possible, I carry the toes or outer ends T T of the pole-pieces further around the armature than the corresponding points $t\,t$ of the poles on the other side of the armature, and in this way am enabled to distribute the magnetism more uniformly with reference to the center line of the armature, and thus to reduce the strong tendency of a field of this character to pull the armature away from its center.

I make no claim to an armature-core formed with trapezoidal slots in its periphery of greater width at the bottom than at the top, the windings or conductors of said armature being contained in said slots, as this I believe to be the invention of William F. Collins, of Chicago, Illinois. My claims, hereinafter made, are directed to this form of slot, in combination with other features referred to in this specification, and particularly pointed out in said claims.

What I claim, as my invention, and desire to secure by Letters Patent, is—

1. The ring-armature core formed with trapezoidal slots or openings in its periphery and coils or windings laid in the slots and passing through the inside of the ring, the windings on the inside of the ring forming trapezoidal-shaped coils or sections which fit against one another and fill the interior of the ring, and the slots being of the same shape and cross-section, so that the coils are symmetrical with respect to the outside and inside of the ring.

2. An electric motor or dynamo-electric machine having an unsymmetrically-fed field, as in the horseshoe type, the armature and field being so constructed on the side opposite the origin of the field magnetism as to cause an increased amount of magnetism to pass through that half of the armature and thereby more or less neutralize the tendency of the field to draw the armature away from its axis of revolution resulting from the unsymmetry of the field, substantially as described.

3. An electric motor or dynamo-electric machine having an unsymmetrically-fed field, as in the horse-shoe type, the pole-pieces being formed so as to embrace the armature on the side opposite the origin of the field magnetism to a greater extent than on the other side, so that the tendency of the field to draw the armature away from its axis of revolution resulting from the unsymmetrical field is more or less neutralized, substantially as described.

SCHUYLER S. WHEELER.

Witnesses:
CHAS. G. CURTIS,
A. D. WILLIAMS, Jr.